V. E. DUNCANSON.
EYEGLASS HOLDER.
APPLICATION FILED NOV. 15, 1919.

1,393,511.                                  Patented Oct. 11, 1921.

INVENTOR
Vincent E. Duncanson
BY James N. Ramsey
ATTORNEY

UNITED STATES PATENT OFFICE.

VINCENT E. DUNCANSON, OF LYNCHBURG, OHIO.

EYEGLASS-HOLDER.

1,393,511.   Specification of Letters Patent.   Patented Oct. 11, 1921.

Application filed November 15, 1919. Serial No. 338,278.

*To all whom it may concern:*

Be it known that I, VINCENT E. DUNCANSON, a citizen of the United States, and a resident of Lynchburg, in the county of Highland and State of Ohio, have invented certain new and useful Improvements in Eyeglass-Holders, of which the following is a specification.

An object of my invention is to produce an eyeglass holder which is an improvement upon my eyeglass holder described in United States Letters Patent No. 1,309,573, granted to me July 8, 1919, in that the retaining of the glasses within the holder is made more positive than in the patented holder above referred to, and in which the removal and replacement of glasses may be accomplished with greater ease.

This and other objects are attained in the holder described in the following specification and illustrated in the accompanying drawing in which.

Figure 1:
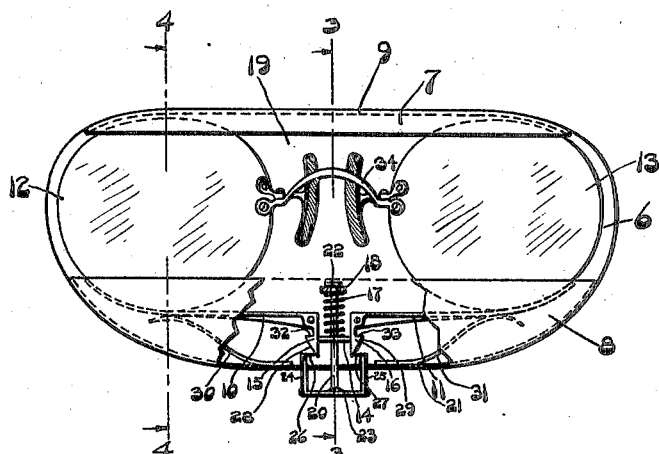
Figure 1 is a front elevational view of a holder embodying my invention, glasses being shown located and locked against displacement therefrom, parts being broken away.

In the preferred form of my invention shown in Figs. 1 to 4, inclusive, a container or case 6 which is preferably made of a light but strong material such as aluminum, is provided, the upper edge of the case as shown, being provided with a turned over flange 7 which prevents accidental displacement of the upper edges of the lenses from the case when locked therein or when released ready for removal, the lower edge being provided with a turned over flange 8 which incloses the locking and releasing mechanism as well as preventing accidental displacement of the lower edges of the lenses.

The upper edges of the lenses are held against the top 9 of the case by a pair of fingers 10 and 11 which bear against the respective lenses 12 and 13 of the glasses and are held in locking position therewith by a wedge 14 which is held between the lower ends of extensions 15 and 16 of the fingers by a spring 17 located between the wedge and an abutment 18 extending between the back 19 and upturned lower edge 8 of the case. Wedge 14 is secured to a pin 20 which is reciprocally mounted in abutment 18 and bottom 21 of the case, a head 22 being provided at the upper end of the pin to prevent displacement thereof under pressure of the spring.

The lower end of the pin, which extends beyond the bottom 21 of the case, is secured to a substantially U-shaped push button 23 which has its branches extending through the bottom and reciprocally mounted therein, sensitive springs 24 and 25 being secured to the branches with their ends turned toward one another to form prongs 26 and 27. These prongs are adapted to engage inclined surfaces 28 and 29 of extensions 15 and 16 of the fingers when the push button is pressed inwardly, the springs 24 and 25 becoming flexed in doing so for the reason that the fingers are held up by a pair of springs 30 and 31 secured to the bottom of the case as shown.

Figure 2:
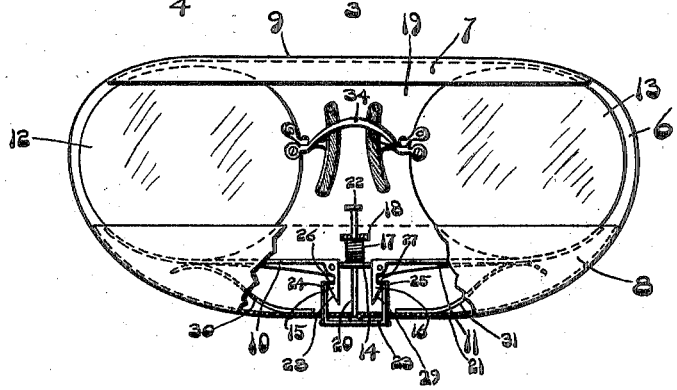
Fig. 2 is a view similar to Fig. 1, showing the eyeglass retaining mechanism unlocked ready for the removal of the glasses from the holder.

When the push button is pressed inwardly to release the glasses, wedge 14 moves upwardly toward the pivotal centers of the fingers, springs 24 and 25 yielding in passing over inclined surfaces 28 and 29 of the fingers, until shoulders 32 and 33 are reached when the springs will take over them and be held in the positions shown in Fig. 2, springs 30 and 31 retaining the fingers in glasses supporting position. The glasses are now ready to be taken from the case. The reason for having springs 24 and 25 yield as above described, is to prevent the fingers from moving and thus loosening the glasses which are being held under the tension of springs 30 and 31.

In removing the glasses after the parts have been brought to the position shown in Fig. 2, it is but necessary to grasp the nose piece 34 of the glasses and to push them downwardly against the pressure of springs 30 and 31, thus causing the fingers to move downwardly slightly. As soon as the upper edges of the lenses are clear of downturned edge 7, the glasses are easily lifted from the case, the fingers not having been moved downwardly far enough to trip the clutch constituting elements 14, 15, 16, 17, 20, 22, 23, 24, 25, 26, 27, 32 and 33.

In replacing the glasses the lower edges of the lenses are placed in engagement with the fingers and the glasses moved downwardly until the upper edges of the lenses can be moved beneath the flange 7 and against the back 19. Having been brought to this position the glasses are pressed down until fingers 10 and 11 have been moved far enough to bring shoulders 32 and 33 from beneath prongs 26 and 27 of springs 24 and 25. Spring 17 thus having been released, the wedge is forced downwardly between extensions 15 and 16, thus lifting the fingers and the glasses until they engage top 9 of the case. The wedge having been brought to the position shown in Fig. 1, the fingers hold the glasses locked within the case, the extensions bearing directly against one another through the agency of wedge 14.

Figure 3:
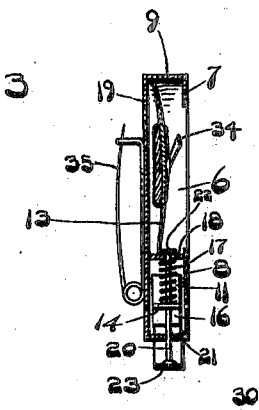
Fig. 3 is a transverse sectional view taken on the line 3—3 of Fig. 1.
Figure 4:
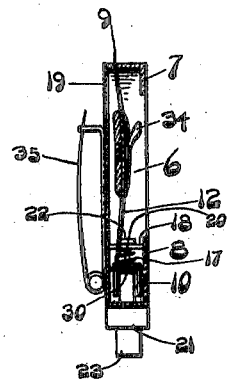
Fig. 4 is a transverse sectional view taken on the line 4—4 of Fig. 1.

In Figs. 3 and 4 I have shown the provision I have made for securing the case to the garments, pins 35 having been secured to the back of the case.

Figure 5:
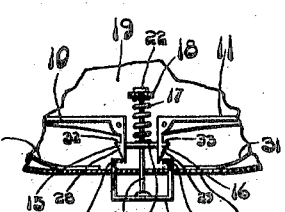
Fig. 5 is a fragmental sectional view of a modified form of construction embodying my invention.

In Fig. 5 a slightly modified form of my invention is shown, springs 24 and 25 of the preferred form having been eliminated and the push button having its ends turned in to form prongs 26ª and 27ª which are rigid and which therefore cause fingers 10 and 11 to yield slightly when moving the clutch to glass releasing position. The movement of the clutch to glass locking position is accomplished in the same manner as above described in the description of the preferred construction.

Having thus described my invention what I claim is:

1. A holder for eyeglasses comprising a substantially flat body portion having the opposite longitudinal edges thereof turned inwardly and space apart, adapted to form spaces for the reception of eyeglasses, resiliently held members within one of the spaces for engaging and holding the eyeglasses, a clutch for retaining the eyeglasses within the holder, and means for retaining the clutch in position to release the glasses to permit removal thereof from the holder and means extending out through the body for operating the clutch.

2. A holder for eyeglasses comprising a substantially flat body portion having the longitudinal edges thereof turned inwardly and spaced apart, adapted to form spaces for the reception of eyeglasses, resiliently held members within one of the spaces for engaging and holding the eyeglasses, a clutch for retaining the members in eyeglass holding position, and means for retaining the clutch in position to release the glasses, said members being adapted to release the clutch upon movement of the glasses against them in replacing within the holder.

3. A holder for eyeglasses comprising a substantially flat body portion, having the longitudinal edges thereof turned inwardly and spaced apart to form spaces for the reception of eyeglasses, fingers having adjacent ends pivotally connected to the holder within one of the spaces and at an intermediate portion thereof, right angle extensions on the fingers adjacent their point of pivotal connection, adapted to occupy a substantially parallel position with relation to each other when the fingers engage the glasses, a pin reciprocally mounted between the extensions, a wedge upon the pin for engaging both extensions to lock both fingers in engagement with the glasses when the pin is moved, a spring adapted to urge the wedge between the extensions, and a push button upon the pin, adapted to move the wedge from engagement with the extensions and to engage the extensions at the termination of its movement to retain the wedge from engagement with the extensions, whereby the glasses may be removed from the holder.

4. A holder for eyeglasses comprising a body having longitudinal edges turned inwardly and spaced apart from said body and from each other to form spaces for the reception of eyeglasses, fingers having adjacent ends pivotally connected to the holder within one of said spaces and at an intermediate portion thereof, each finger having a shoulder and inclined surface, a pin reciprocally mounted between said extensions, a wedge upon the pin adapted to engage both extensions to lock both fingers in holding engagement with the glasses when the pin is moved, a spring adapted to urge the wedge between the extensions, a push button upon the pin, holding springs upon the push button, said pin being adapted to move the wedge from engagement with the extensions while said springs traverse said inclined surfaces and engage said shoulders at the termination of its movement to retain the wedge from engagement with the extensions whereby the glasses may be removed from the holder.

5. A holder for eyeglasses comprising a body having longitudinal edges turned inwardly and spaced apart from said body and from each other to form spaces for the reception of eyeglasses, fingers having adjacent ends pivotally connected to the holder within one of said spaces, each finger having a shoulder, a pin reciprocally mounted between said extensions, a wedge upon the pin adapted to engage both extensions to lock both fingers in holding engagement with the glasses when the pin is moved, a spring adapted to urge the wedge between the extensions, a push button upon the pin, holding springs upon the push button, said pin being adapted to move the wedge from engagement with the extensions and to bring said springs into engagement with said shoulders at the termination of its movement to retain the wedge from engagement with the extensions whereby the glasses may be removed from the holder.

VINCENT E. DUNCANSON.

Witnesses:
JAMES N. RAMSEY,
MARY E. MCCONNELL.